(12) United States Patent
Munk

(10) Patent No.: US 8,539,658 B2
(45) Date of Patent: Sep. 24, 2013

(54) AUTONOMOUS CARRIER FOR CONTINUOUSLY MOVING WING ASSEMBLY LINE

(75) Inventor: Clayton L. Munk, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 1059 days.

(21) Appl. No.: 12/550,666

(22) Filed: Aug. 31, 2009

(65) Prior Publication Data

US 2011/0054694 A1    Mar. 3, 2011

(51) Int. Cl.
*B23Q 3/00* (2006.01)

(52) U.S. Cl.
USPC .......................................... 29/281.1; 29/281.5

(58) Field of Classification Search
USPC ..................... 29/281.1, 271, 281.5; 269/900, 269/903
See application file for complete search history.

(56) References Cited

U.S. PATENT DOCUMENTS

| | | | |
|---|---|---|---|
| 4,017,099 A | | 4/1977 | Hegel et al. |
| 5,033,178 A | * | 7/1991 | Woods .......................... 29/281.1 |
| 5,587,900 A | | 12/1996 | Bullen |
| 5,848,458 A | * | 12/1998 | Bullen .......................... 29/33 K |
| 5,920,974 A | * | 7/1999 | Bullen .......................... 29/33 K |
| 6,314,630 B1 | | 11/2001 | Munk et al. |
| 6,629,354 B1 | * | 10/2003 | Kline .............................. 29/559 |
| 6,779,272 B2 | | 8/2004 | Day et al. |
| 7,364,147 B2 | * | 4/2008 | Shinozaki ...................... 269/266 |
| 8,322,700 B2 | * | 12/2012 | Saberton et al. .............. 269/296 |
| 2009/0112349 A1 | | 4/2009 | Cobb et al. |
| 2011/0054694 A1 | * | 3/2011 | Munk ............................ 700/275 |

FOREIGN PATENT DOCUMENTS

| | | |
|---|---|---|
| EP | 1780120 A2 | 2/2007 |
| WO | 2009068106 A1 | 6/2009 |

OTHER PUBLICATIONS

"Aerospace Applications—Industry Overview", Hamar Laser, Laser Alignment Systems, Applications Index, Copyright 2003, retrieved Jul. 14, 4009, <http://www.hamarlaser.com/apps/aerospace_2100.htm>.
"L-730 Precision Leveling Laser Alignment System", Hamar Laser, Recommended System, Copyright 2003, retrieved Jul. 9, 2009, <http:www.hamarlaser.com/systems/L730/730aerosys_toolingleveling.htm>.
UK Patent Office Search and Examination Report for application GB1013458.3 dated Nov. 18, 2010.

* cited by examiner

*Primary Examiner* — Lee D Wilson
(74) *Attorney, Agent, or Firm* — Yee & Associates, P.C.

(57) ABSTRACT

A method and apparatus for moving a structure. The structure is supported on a carrier. The carrier comprises a platform having a first side and a second side, a movement system associated with the first side and configured to move the platform on a surface, a support system associated with the second side of the platform and configured to support the structure on the platform, and a leveling system configured to substantially maintain the structure in a desired orientation during movement of the platform on the surface. The carrier is moved with the structure over the surface. At least one of the movement system and the support system is adjusted to substantially maintain the structure in the desired orientation.

20 Claims, 16 Drawing Sheets

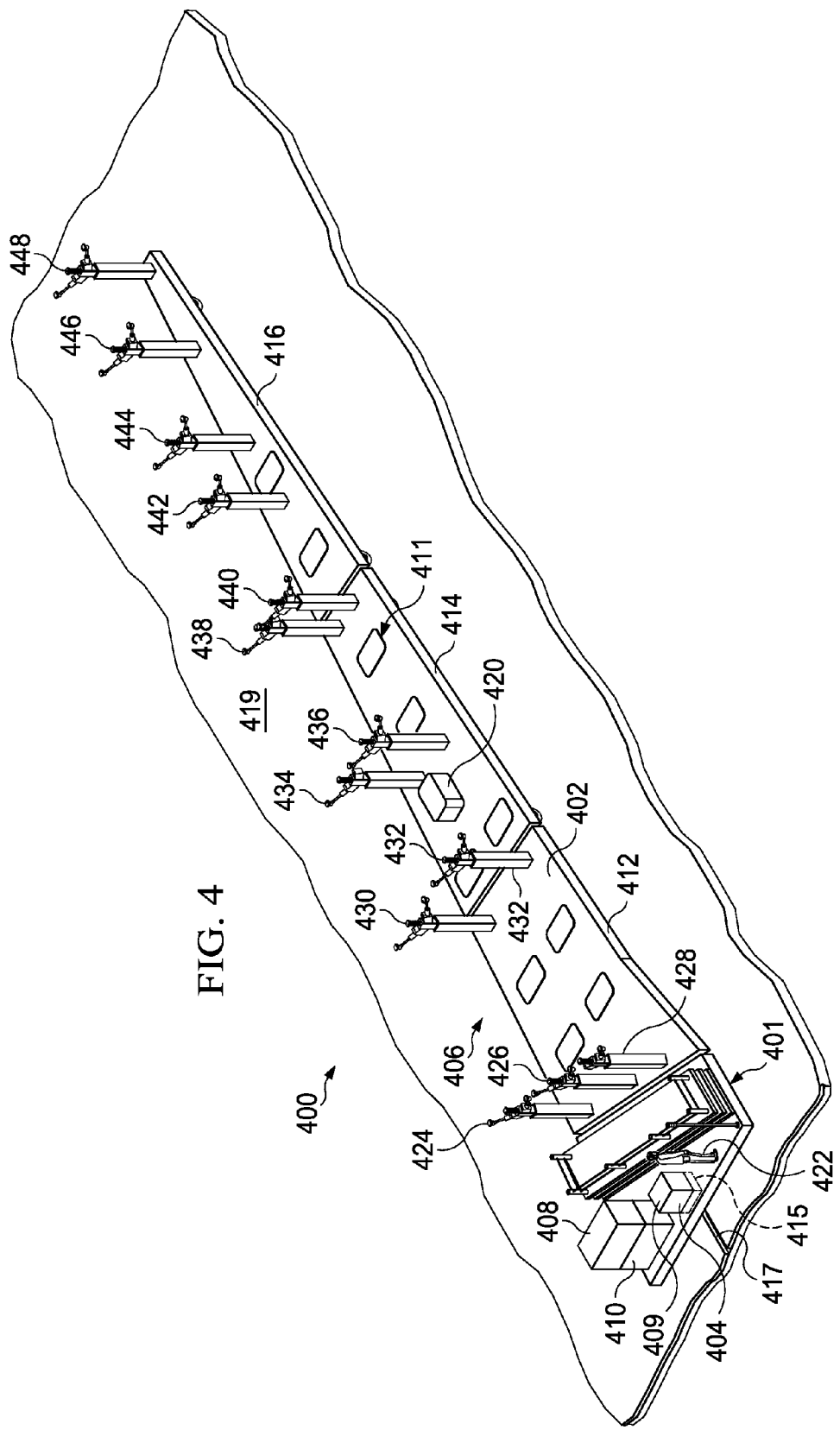

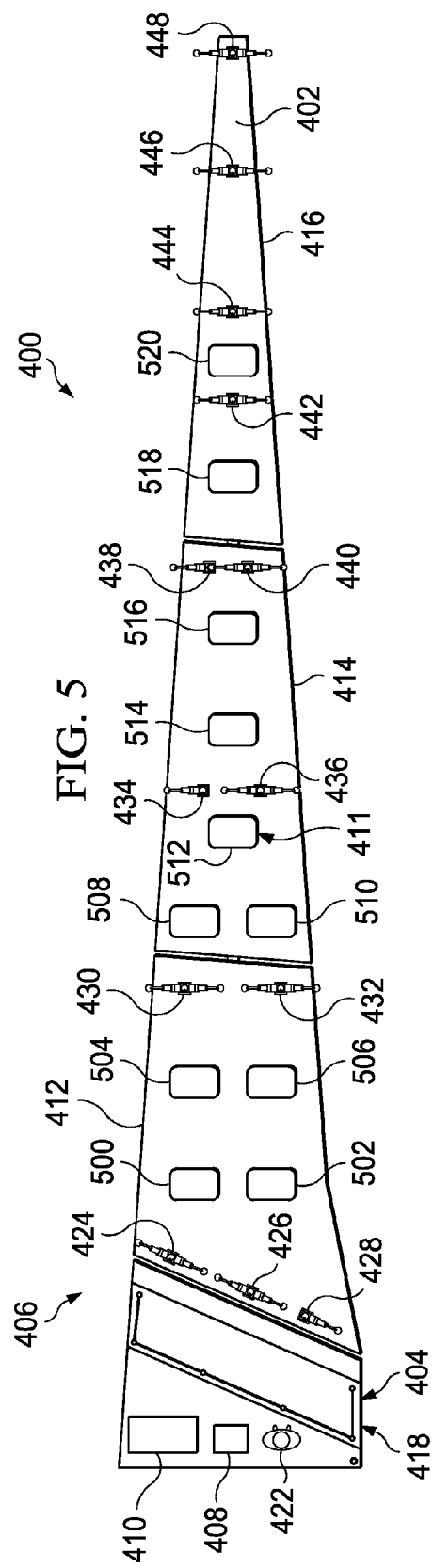

AUTONOMOUS CARRIER FOR CONTINUOUSLY MOVING WING ASSEMBLY LINE

BACKGROUND INFORMATION

1. Field

The present disclosure relates generally to manufacturing and, in particular, to a method and apparatus for manufacturing aircraft. Still more particularly, the present disclosure relates to a method and apparatus for moving aircraft structures during a manufacturing process.

2. Background

In manufacturing aircraft, portions of an aircraft are assembled and then put together to form the aircraft. For example, the fuselage of an aircraft may be formed by assembling a structure, such as a frame. Thereafter, skin panels may be attached to the frame to form the fuselage. As another example, with composite materials, the fuselage may be created in cylindrical sections. These different cylindrical sections may be put together to form the fuselage of an aircraft.

In yet another example, wings, horizontal stabilizers, and vertical stabilizers may be assembled from smaller pieces or components. For example, with a wing, ribs, spars, and skin panels may be assembled to form the wing.

In assembling the structures, operations such as, for example, without limitation, positioning, drilling, fastening, painting, sanding, and/or other suitable operations are performed to manufacture a wing. Currently, operations are typically performed with the wing in a stationary position, and the different tools are moved around the wing to perform the different assembly operations.

The tools may be moved by human operators. In other instances, the tools may be automated tools that move on a rail, track, or wheel system. Some operations may be performed on the wing at a first station. Thereafter, the wing may be moved to another station at which additional operations are performed. As an example, one station may have tools to perform drilling and fastening operations for skin panels, while another station may have tools to paint the wing. This type of assembly may require more time than desired to assemble the wing.

The movement of the wing from one station to another station takes time during which operations on the wing are not performed. As a result, the time needed to move the wing from one station to another station adds to the total amount of time needed to assemble the wing.

Therefore, it would be advantageous to have a method and apparatus that takes into account one or more of the issues discussed above, as well as possibly other issues.

SUMMARY

In one advantageous embodiment, an apparatus comprises a platform, a movement system, a support system, and a leveling system. The platform has a first side and a second side. The movement system is associated with the first side and configured to move the platform on a surface. The support system is associated with the second side of the platform and configured to support a structure on the platform. The leveling system is configured to substantially maintain the structure in a desired orientation during movement of the platform on the surface.

In another advantageous embodiment, a carrier for an aircraft structure comprises a platform, a movement system, a plurality of support members, a laser alignment system, an actuator system, and a controller. The platform has a first side and a second side. The movement system has a plurality of wheels associated with the first side and is configured to move the platform on a surface. The plurality of support members is associated with the second side and is configured to hold the aircraft structure on the platform. The actuator system is associated with the plurality of wheels and is configured to adjust a distance between each wheel in the plurality of wheels and the first side of the platform. The controller is coupled to the laser alignment system and the actuator system. The controller is configured to control the actuator system to substantially maintain the structure in a desired orientation.

In yet another advantageous embodiment, a method is present for moving a structure. The structure is supported on a carrier. The carrier comprises a platform having a first side and a second side, a movement system associated with the first side and configured to move the platform on a surface, a support system associated with the second side of the platform and configured to support the structure on the platform, and a leveling system configured to substantially maintain the structure in a desired orientation during movement of the platform on the surface. The carrier is moved with the structure over the surface. At least one of the movement system and the support system is adjusted to substantially maintain the structure in the desired orientation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 4 is an illustration of a perspective view of a carrier in accordance with an advantageous embodiment;

FIG. 5 is an illustration of a top view of a carrier in accordance with an advantageous embodiment;

FIG. 6 is an illustration of a bottom view of a carrier in accordance with an advantageous embodiment;

DETAILED DESCRIPTION

Figure 1:
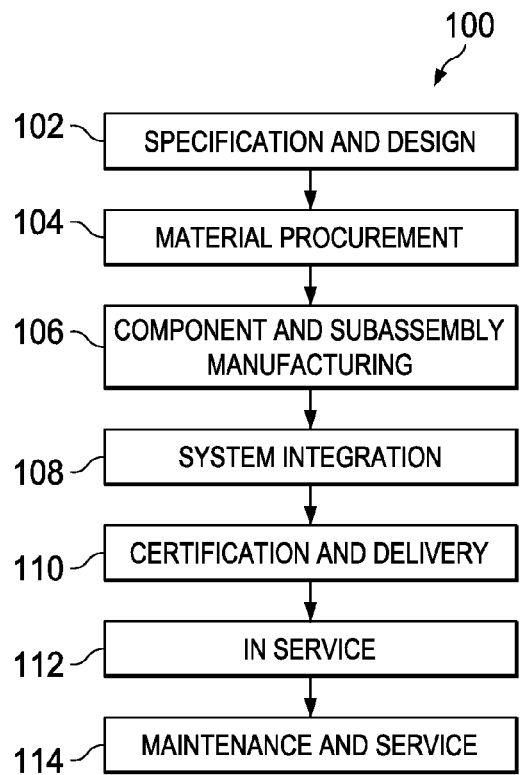
FIG. 1 is an illustration of an aircraft manufacturing and service method in accordance with an advantageous embodiment.
Figure 2:
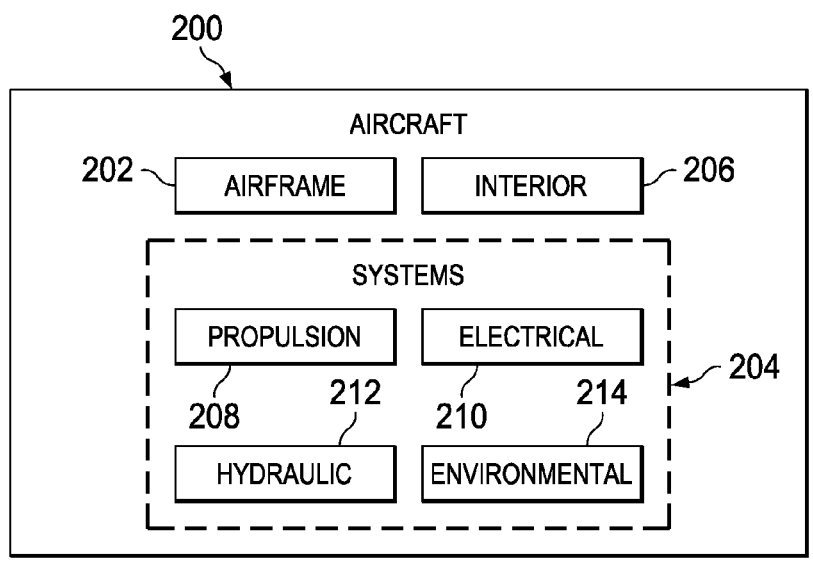
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of or reduce the cost of aircraft 200.

The different advantageous embodiments recognize and take into account a number of different considerations. For example, the different advantageous embodiments recognize and take into account that structures, such as wings and stabilizers, are manufactured in a stationary position. For example, a wing may be manufactured in a station in a horizontal position. This process may involve performing a number of operations on the wing. The tools used to assemble the different components may move around the booth to perform different operations.

These operations include, for example, without limitation, drilling operations and fastening operations. These operations may be performed to attach components, such as ribs and spars, to each other. Further, these operations may be used to attach skin panels to the structure to form the wing.

After these operations have been completed, the wing may be moved to another station. At this station, other operations may be performed. These operations include, for example, sanding, painting, and/or other suitable operations.

The different advantageous embodiments recognize and take into account that when a structure is manufactured, the structure may be positioned in a desired orientation. This desired orientation is substantially maintained during manufacturing of the structure using one or more advantageous embodiments. By maintaining the desired orientation, the structure may be manufactured within desired tolerances. As a result, a desired amount of performance or level of maintenance may be achieved.

For example, one or more of the different advantageous embodiments recognize and take into account that if a wing is manufactured at a station and the orientation changes beyond some desired amount, the different features of the wing may not have the desired tolerances. When one or more features of a wing are out of tolerance, the performance and/or maintenance of the wing may be affected. For example, the performance of a wing may be reduced if the orientation of the wing moves beyond some desired amount during manufacturing. As another example, the interchangeability of parts on a wing may be reduced.

One or more of the different advantageous embodiments recognize and take into account that this situation may increase the maintenance time and cost for the wing. For example, without limitation, a control surface, such as a flap, may require reworking other portions of the wing to install a new flap.

The different advantageous embodiments also recognize that efficiencies and reduction in time to manufacture a wing may occur by performing the operations on the wing with the wing being moved by the tools performing the operations. This type of movement is an assembly line type of movement, which may be more efficient than movement in which the wing is moved from one station to another station.

The different advantageous embodiments recognize and take into account that the size of aircraft structures and the tolerances may make the movement of tools on wheels or rails impractical or expensive. Further, the different advantageous embodiments recognize and take into account that as the size of an aircraft structure increases, the size of the platform used to move the aircraft structure down an assembly line also increases.

In other words, maintaining the aircraft structure in a desired orientation as the aircraft structure is moved down an assembly line may depend on using platforms that increase in size as the aircraft structure increases in size. These platforms may be constructed with a size and stiffness selected to maintain the aircraft structure in the desired orientation. The different advantageous embodiments recognize that although this type of platform may maintain the aircraft structure in the desired orientation, these platforms may have a greater size and expense than desired.

Thus, the different advantageous embodiments provide a method and apparatus for manufacturing structures. In one advantageous embodiment, an apparatus comprises a platform, a movement system, a support system, and a leveling system. The platform has a first side and a second side. The movement system is associated with the first side and configured to move the platform on its surface. The support structure is associated with the second side of the platform and configured to support a structure on the platform. The leveling system is configured to substantially maintain the structure in a desired orientation during movement of the platform on the surface.

Figure 3:
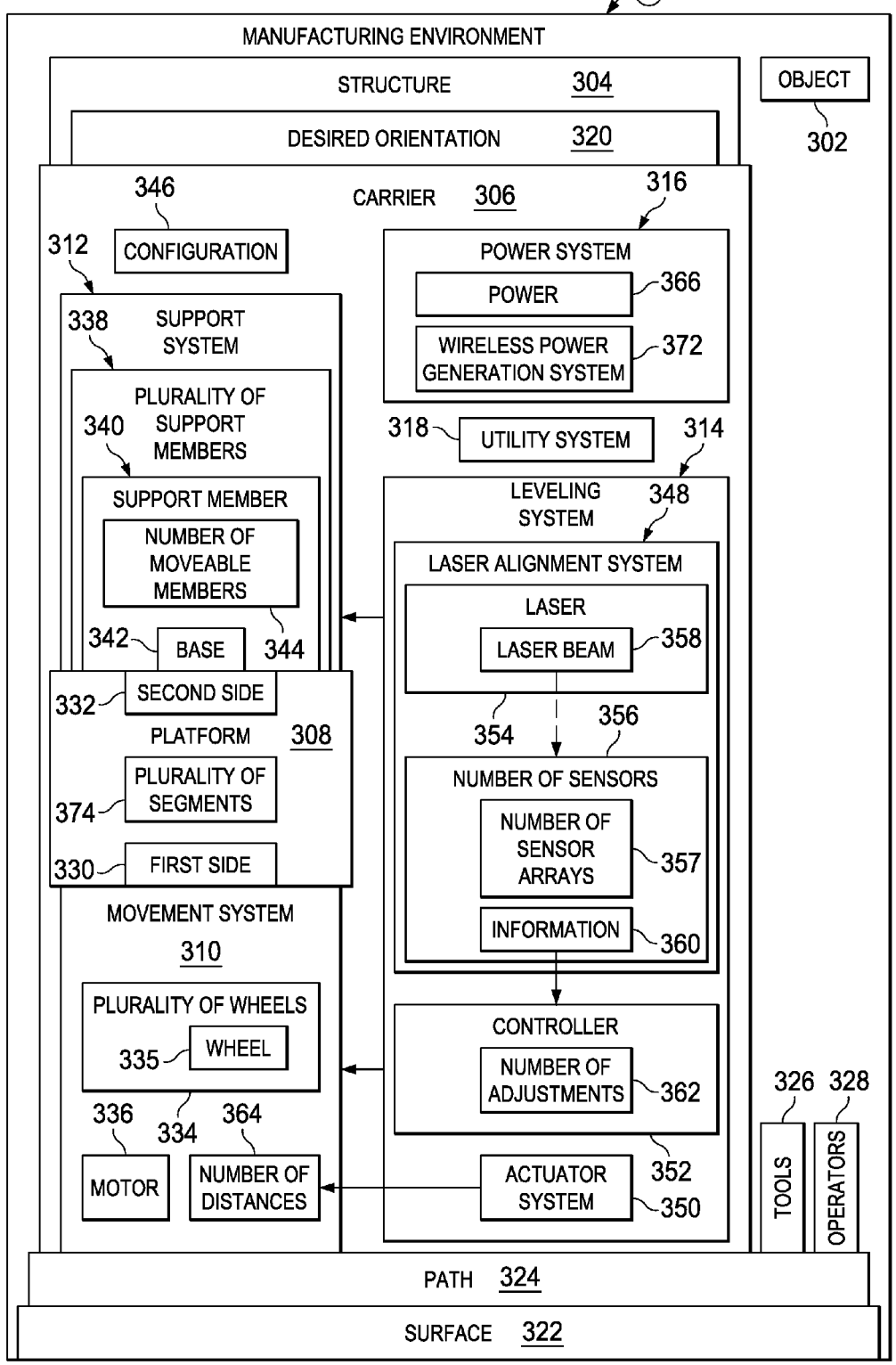
FIG. 3 is an illustration of a manufacturing environment in accordance with an advantageous embodiment.

With reference now to FIG. 3, an illustration of a manufacturing environment is depicted in accordance with an advantageous embodiment. Manufacturing environment 300 may be employed to manufacture object 302. In particular, manufacturing environment 300 may be used to manufacture structure 304 for object 302.

In these illustrative examples, object 302 may be, for example, without limitation, aircraft 200 in FIG. 2. Structure 304 may be, for example, without limitation, a wing, a horizontal stabilizer, a vertical stabilizer, an engine, a fuselage, or some other suitable type of structure. Structure 304 also may be a subassembly for a structure.

In this depicted example, structure 304 is manufactured using carrier 306. Carrier 306 includes platform 308, movement system 310, support system 312, leveling system 314, power system 316, and utility system 318.

In these illustrative examples, carrier 306 may substantially maintain structure 304 in desired orientation 320 during manufacturing of structure 304. This manufacturing may involve a number of different operations. For example, the operations may include positioning parts, drilling holes, installing fasteners, finishing surfaces, painting surfaces, and/or other suitable operations in addition to or in place of the ones listed.

Carrier 306 may move structure 304 over surface 322. This movement of carrier 306 may be along path 324 in manufacturing environment 300. Tools 326 are located around path 324 and perform operations to assemble structure 304, while structure 304 is in desired orientation 320 on carrier 306. Additionally, operators 328 also may be located around path 324. Operators 328 may perform operations to assemble structure 304.

In this illustrative example, platform 308 has first side 330 and second side 332. First side 330 is located facing surface 322. Movement system 310 is associated with first side 330. In this example, movement system 310 includes plurality of wheels 334 and motor 336. Motor 336 extends and/or retracts one or more of plurality of wheels 334 to keep carrier 306 level as carrier 306 moves over surface 322. Further, motor 336 uses wheel 335 in plurality of wheels 334 to move carrier 306 along surface 322 in these illustrative examples. In other examples, additional wheels in plurality of wheels 334 may be turned by motor 336.

In these illustrative examples, support system 312 holds structure 304 on carrier 306. In this particular example, support system 312 comprises plurality of support members 338. Plurality of support members 338 is configured to support structure 304.

In this example, support member 340 is an example of one of plurality of support members 338. Support member 340 comprises base 342 and number of moveable members 344. Base 342 is associated with second side 332 of platform 308. Number of moveable members 344 is configured to hold structure 304. Number of moveable members 344 may be moved to allow access to different parts of structure 304. For example, support member 340 may block access to a surface or an internal portion of structure 304. In these examples, number of moveable members 344 may move to allow access to structure 304.

In the illustrative examples, surface 322 may not be level over all of path 324. Leveling system 314 on carrier 306 substantially maintains structure 304 in desired orientation 320 while moving over surface 322. As a result, desired orientation 320 may be substantially maintained even though surface 322 may not be substantially level.

Desired orientation 320 may be any of various orientations, depending on the particular implementation. For example, desired orientation 320 may be substantially horizontal. In some examples, desired orientation 320 may be substantially aligned with a plane, such as a plane through a particular part or component in structure 304. In yet other advantageous embodiments, desired orientation 320 may be a vertical position, at an angle relative to a horizontal plane, or some other suitable position.

As one illustrative example, desired orientation 320 may be at an angle relative to a horizontal plane such that structure 304 is positioned to provide a desired height between structure 304 and operators 328. The desired height may be a height that provides a desired level of interaction between operators 328 and structure 304. As yet another example, desired orientation 320 may have an upper surface of structure 304 substantially parallel with surface 322.

In some advantageous embodiments, desired orientation 320 may be along a line through structure 304. For example, without limitation, if structure 304 is a wing, desired orientation 320 may be along a line or axis for hinge lines for flaps on the wing.

Leveling system 314 changes configuration 346 of one or more components of carrier 306 to substantially maintain structure 304 in desired orientation 320. For example, without limitation, leveling system 314 is configured to adjust at least one of movement system 310 and support system 312 to substantially maintain structure 304 in desired orientation 320.

In this illustrative example, leveling system 314 includes laser alignment system 348, actuator system 350, and controller 352. In these examples, laser alignment system 348 includes laser 354 and number of sensors 356. Laser 354 generates laser beam 358 to illuminate one or more of number of sensors 356. Number of sensors 356 is associated with first side 330 of platform 308 in this example.

Further, number of sensors 356 may be grouped into number of sensor arrays 357. For example, each of number of sensor arrays 357 may include a portion of number of sensors 356. In these illustrative examples, the sensors in each of number of sensor arrays 357 are aligned in a direction substantially perpendicular to first side 330 of platform 308.

Further, in these examples, each of number of sensor arrays 357 may be positioned within a selected distance from an associated wheel in plurality of wheels 334.

Number of sensors 356 generates information 360 when laser beam 358 is detected by one or more of number of sensors 356. Information 360 is used by controller 352 to identify number of adjustments 362 needed to substantially maintain structure 304 in desired orientation 320.

After identifying number of adjustments 362, controller 352 controls actuator system 350 to adjust at least one of movement system 310 and support system 312. For example, actuator system 350 may attach at least some of plurality of wheels 334 to first side 330 of platform 308.

With this type of configuration, actuator system 350 controls number of distances 364 between each of plurality of wheels 334 and first side 330. In these illustrative examples, number of adjustments 362 to number of distances 364 is performed to substantially maintain structure 304 in desired orientation 320.

In other words, configuration 346 of platform 308 may be changed to maintain structure 304 in substantially desired orientation 320. For example, some of plurality of wheels 334 may encounter a dip in surface 322, while carrier 306 moves over surface 322. These wheels may have their distances in number of distances 364 increased relative to the distances of other wheels in plurality of wheels 334.

In some advantageous embodiments, number of moveable members 344 may be associated with actuator system 350. In this illustrative example, actuator system 350 may control number of moveable members 344 for support member 340. This control may be performed for all of plurality of support members 338 in a manner that substantially maintains structure 304 in desired orientation 320.

In one example, some of plurality of support members 338 may be changed in configuration such that they change a distance between structure 304 and second side 332.

Power system 316 in carrier 306 is configured to provide power 366 to carrier 306. For example, power 366 may be used to operate motor 336. In these illustrative examples, power system 316 may take a number of different forms. For example, without limitation, power system 316 takes the form of wireless power system 372 in these examples. Wireless power system 372 may be at least one of an inductive power system, a laser power system, and some other suitable type of wireless power system.

Further, power 366 also may be used by utility system 318 to provide various utilities. For example, utility system 318 may include, for example, without limitation, power, compressed air, a vacuum, lighting, and/or other suitable utilities. Further, utility system 318 may include air for a portable drilling system or nut runner or may include a Venturi vacuum system. These utilities are provided to provide utilities for manufacturing structure 304.

In these illustrative examples, platform 308 may comprise plurality of segments 374. Plurality of segments 374 has a coupled state, while supporting structure 304. After structure 304 is removed from carrier 306, plurality of segments 374 may be placed into a decoupled state. In this state, platform 308 may have a smaller turning radius than when in the coupled state.

In this manner, one or more of the different advantageous embodiments provides a capability to assemble components to manufacture structure 304. This assembly may occur while structure 304 moves along path 324 in manufacturing environment 300. The movement of structure 304 may be continuous and/or pulsed. With a pulsed movement, structure 304 may be moved in pulses, such as about five-foot to about 10-foot increments. In other advantageous embodiments, structure 304 may be moved by the full length of structure 304.

The selection of the distance for the movement may be such that a tool within tools 326 is capable of reaching portions of structure 304 needed to perform the operations. The next movement provides the tool a capability to reach another portion of structure 304 to perform operations. With a continuous movement, tools 326 are configured to perform operations taking into account the movement of structure 304 in carrier 306.

With those types of movement of structure 304 in substantially desired orientation 320, manufacturing operations may be performed on structure 304 with fewer interruptions as compared to currently used manufacturing systems in which structures are moved from one station to another station for manufacturing.

Further, by using carrier 306, the assembly of structure 304 may be performed, while moving structure 304 along path 324 such that structure 304 is in substantially desired orientation 320 during the manufacturing process. Of course, when certain operations are performed, desired orientation 320 may be changed and maintained for that phase of manufacturing for structure 304.

The illustration of manufacturing environment 300 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, a number of carriers, in addition to carrier 306, may be used to support structure 304. In this type of implementation, the additional carriers may be coordinated by controller 352 or by a remote computer system. In yet other advantageous embodiments, power system 316 may be a wire power system. In this type of embodiment, the wire connection may be overhead or underneath with respect to carrier 306.

As another example, leveling system 314 may be implemented using other systems in addition to or in place of laser alignment system 348. For example, an inertial measurement unit or a number of gyroscopes may be used. Additionally, a number of sensors may be placed on carrier 306. The number of sensors may be interrogated by a laser or radio frequency transmitters located in manufacturing environment 300. The information from interrogating the sensors may be used to determine whether changes for carrier 306 are needed to maintain structure 304 in desired orientation 320.

In still other advantageous embodiments, other types of mechanisms may be used in movement system 310 in addition to or in place of plurality of wheels 334. For example, tracks, feet, or some other suitable mechanism may be used.

With reference now to FIG. 4, an illustration of a perspective view of a carrier is depicted in accordance with an advantageous embodiment. In this illustrative example, carrier 400 is an example of one manner in which carrier 306 in FIG. 3 may be implemented.

In this illustration, carrier 400 has segment 401, platform 402, movement system 404, support system 406, controller 408, utility system 410, and lighting system 411.

In this illustrative example, platform 402 is formed from segment 412, segment 414, and segment 416. Segments 412, 414, and 416 are detachable from each other in this illustrative example. For example, segment 416 may be detached from platform 402 to allow access to a structure being supported by carrier 400.

Power system 415, shown in phantom in this view, also may be located underneath motor 409. Power system 415 may be an example of an implementation of power system 316 in FIG. 3. Power system 415 is an inductive power system in this illustrative example. In other words, power system 415 provides power for carrier 400 through a wireless transfer of energy. Inductive line 417 may be present within surface 419 through which power system 415 transfers power provided by inductive line 417 to carrier 400.

In this example, movement system 404 includes motor 409. Power system 415 provides power for motor 409 to platform 402 on surface 419.

Utility system 410 generates utilities that may be distributed through carrier 400. These utilities include, for example, power, compressed air, a vacuum, and other suitable utilities. Compressed air and a vacuum may be generated through a compressor in utility system 410 that may be powered by power system 415. In this illustrative example, lift 420 is present on segment 414 of platform 402. Lift 420 may be used by an operator, such as operator 422, to reach various parts of a structure that may be supported by carrier 400.

Support system 406 includes support members 424, 426, 428, 430, 432, 434, 436, 438, 440, 442, 444, 446, and 448 in this illustrative example. Support members 424, 426, 428, 430, 432, 434, 436, 438, 440, 442, 444, 446, and 448 are configured to support a structure on platform 402. Each of these support members is configured to move or retract to allow access to different parts of a structure that may be supported by support system 406.

In this illustrative example, controller 408 may be part of a leveling system for carrier 400. This leveling system is not seen in this view of carrier 400. In this configuration for carrier 400, controller 408, utility system 410, a portion of movement system 404, and the inductive power system (not shown) for carrier 400 may be located on segment 401.

In this illustrative example, segment 401 may take the form of a tractor. Segment 401 is detachable from platform 402. In this manner, maintenance, service, repair, and/or replacement operations may be performed on the different systems located on segment 401.

Turning now to FIG. 5, an illustration of a top view of a carrier is depicted in accordance with an advantageous embodiment. Another view of segments 412, 414, and 416 is shown in this top view. In this view, lights 500, 502, 504, 506, 508, 510, 512, 514, 516, 518, and 520 can be seen for lighting system 411.

Turning now to FIG. 6, an illustration of a bottom view of a carrier is depicted in accordance with an advantageous embodiment. In this view, wheels 600, 602, 604, 606, 608, 610, 612, 614, 616, 618, and 619 are seen for movement system 404.

Further, leveling system 620 is seen in this depicted example. Leveling system 620 includes laser 622, which generates a laser beam that strikes sensor arrays 624, 626, 628, 630, 632, 634, 636, 638, 640, and 642, which are located on bottom side 666 of platform 402. These sensor arrays are positioned within a selected distance from associated wheels 600, 602, 604, 606, 608, 610, 612, 614, 616, and 618, respectively. The information generated by laser 622 and sensor arrays 624, 626, 628, 630, 632, 634, 636, 638, 640, and 642 is used to generate information to control leveling system 620. In these illustrative examples, leveling system 620 may be controlled by controller 408 in FIG. 4.

For example, laser 622 takes the form of a rotating laser. As laser 622 rotates, laser 622 generates a laser beam that strikes a sensor in one of sensor arrays 624, 626, 628, 630, 632, 634, 636, 638, 640, and 642. Depending on the sensor array and the particular sensor within the sensor array that the laser beam strikes, information is generated about a deflection of the portion of platform 402 at which the sensor array is located with respect to surface 419 in FIG. 4. This information is used by controller 408 of leveling system 620 to control leveling system 620 to maintain a structure being supported by carrier 400 in a desired orientation with respect to surface 419 in FIG. 4.

In these examples, leveling system 620 also includes actuators 646, 648, 650, 652, 654, 656, 658, 660, 662, and 664, which are associated with wheels 600, 602, 604, 606, 608, 610, 612, 614, 616, and 618, respectively. These actuators may change the distance between the wheels from bottom side 666 of platform 402. In other words, these actuators may extend and/or retract these wheels with respect to bottom side 666 of platform 402. The extension and/or retraction of these wheels is controlled by controller 408 of leveling system 620.

These actuators may be, for example, without limitation, electromechanical actuators, pneumatic pistons, linear actuators, rotary actuators, mechanical actuators, lead screws, and/or other suitable types of actuators. Also, other numbers of actuators, wheels, or other mechanisms may be used in place of the 10 actuators and 10 wheels illustrated in this example. Also, in some embodiments, some wheels may not have actuators associated with them.

In this illustrative example, wheel 619 is seen on bottom side 668 of segment 401 of carrier 400. Wheel 619 is used to move carrier 400 along surface 419 in FIG. 4 using motor 409 and movement system 404.

Figure 7:
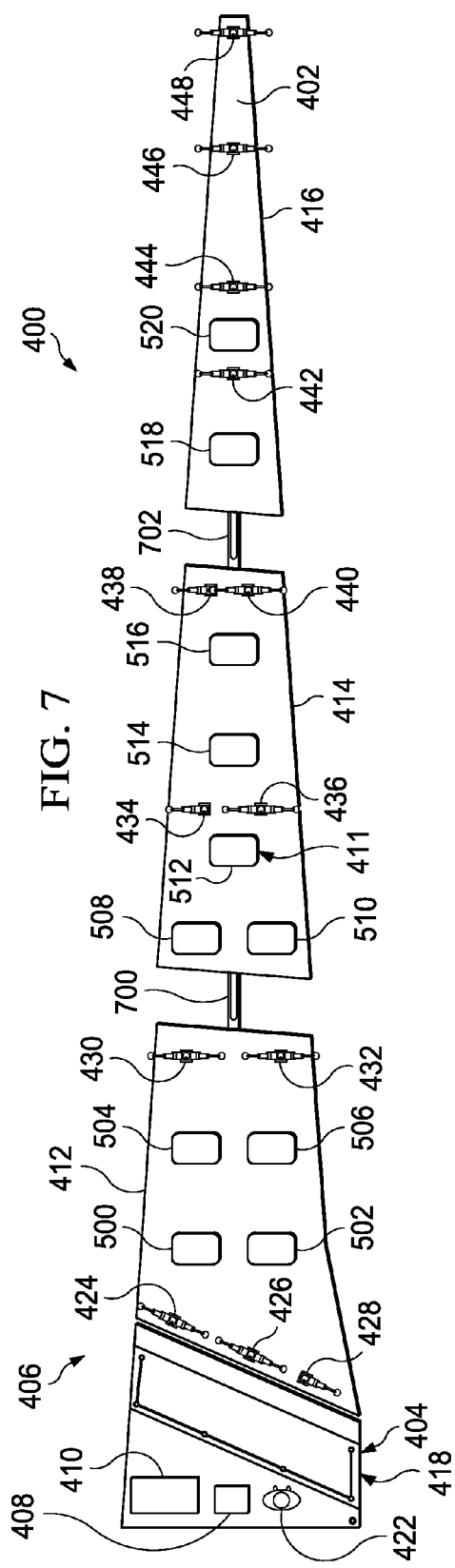
FIG. 7 is an illustration of a top view of a carrier in an uncoupled state in accordance with an advantageous embodiment.

Turning now to FIG. 7, an illustration of a top view of a carrier in an uncoupled state is depicted in accordance with an advantageous embodiment. In this example, carrier 400 is in an uncoupled state with segments 412, 414, and 416 separated from each other. Connector 700 connects segment 412 to segment 414. Connector 702 connects segment 414 to segment 416. These connectors allow carrier 400 to turn with a smaller turning radius.

Figure 8:
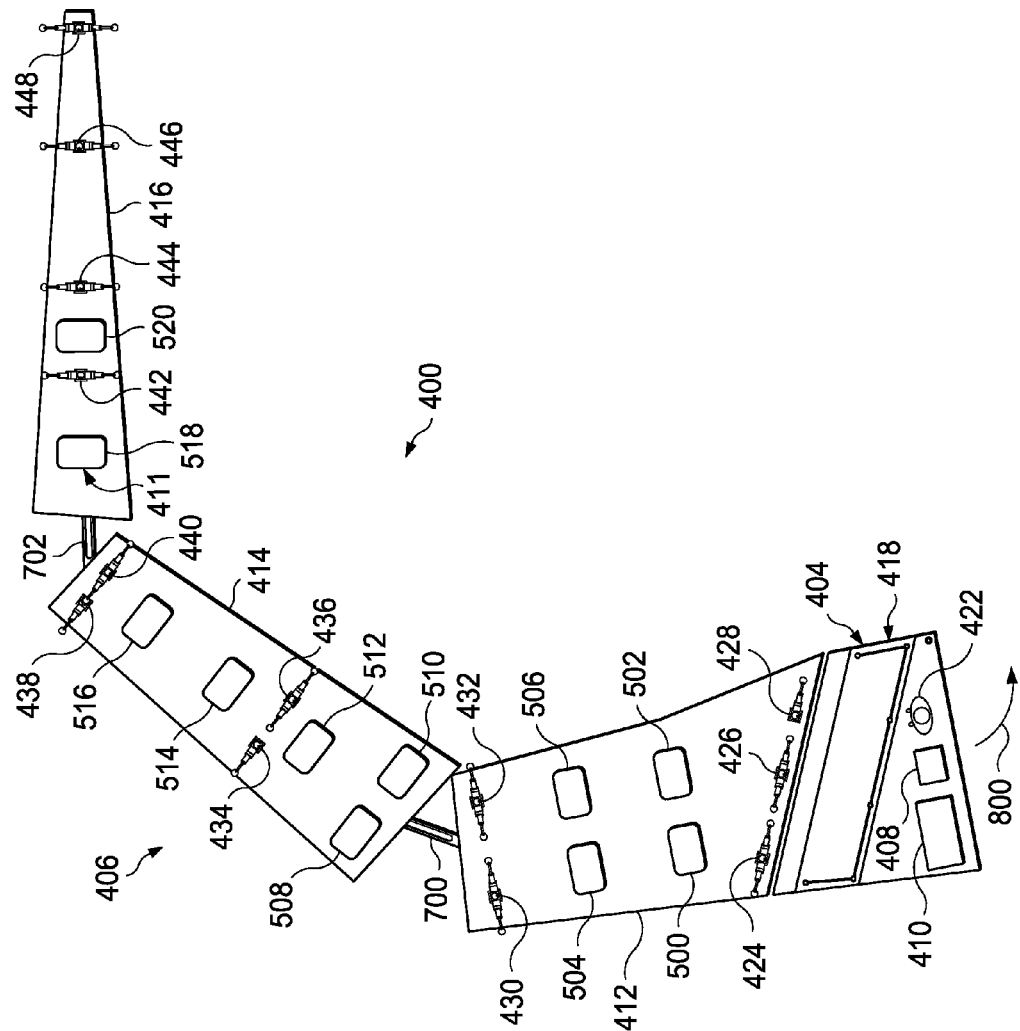
FIG. 8 is an illustration of a carrier in a turn in accordance with an advantageous embodiment.

With reference now to FIG. 8, an illustration of a carrier in a turn is depicted in accordance with an advantageous embodiment. In this example, carrier 400 is turning in the direction of arrow 800. Segments 412, 414, and 416 are uncoupled to allow for a smaller turning radius. This decoupling of the segments may be useful when a carrier has completed moving a structure and is ready to return to the original location or some other location.

The illustrations of carrier 400 in FIGS. 4-8 are not meant to imply physical or architectural limitations to the manner in which different carriers may be implemented. For example, other carriers may have other numbers of segments other than segments 412, 414, and 416. For example, other carriers may have two segments, five segments, or some other number of segments.

Additionally, in some advantageous embodiments, lighting system 411 may be omitted. In still other advantageous embodiments, carrier 400 may have a different shape other than the one shown. For example, carrier 400 may have a rectangular shape as seen from a top view.

Turning now to FIGS. 9-13, illustrations of an assembly sequence for a wing using a carrier are depicted in accordance with an advantageous embodiment. In this illustrative example, carrier 900 is an example of one implementation for carrier 306 that may be used to manufacture structure 304 in the form of wing 901 within manufacturing environment 300.

In these examples, carrier 900 may support wing 901 during the assembly or manufacture of wing 901.

Figure 9:
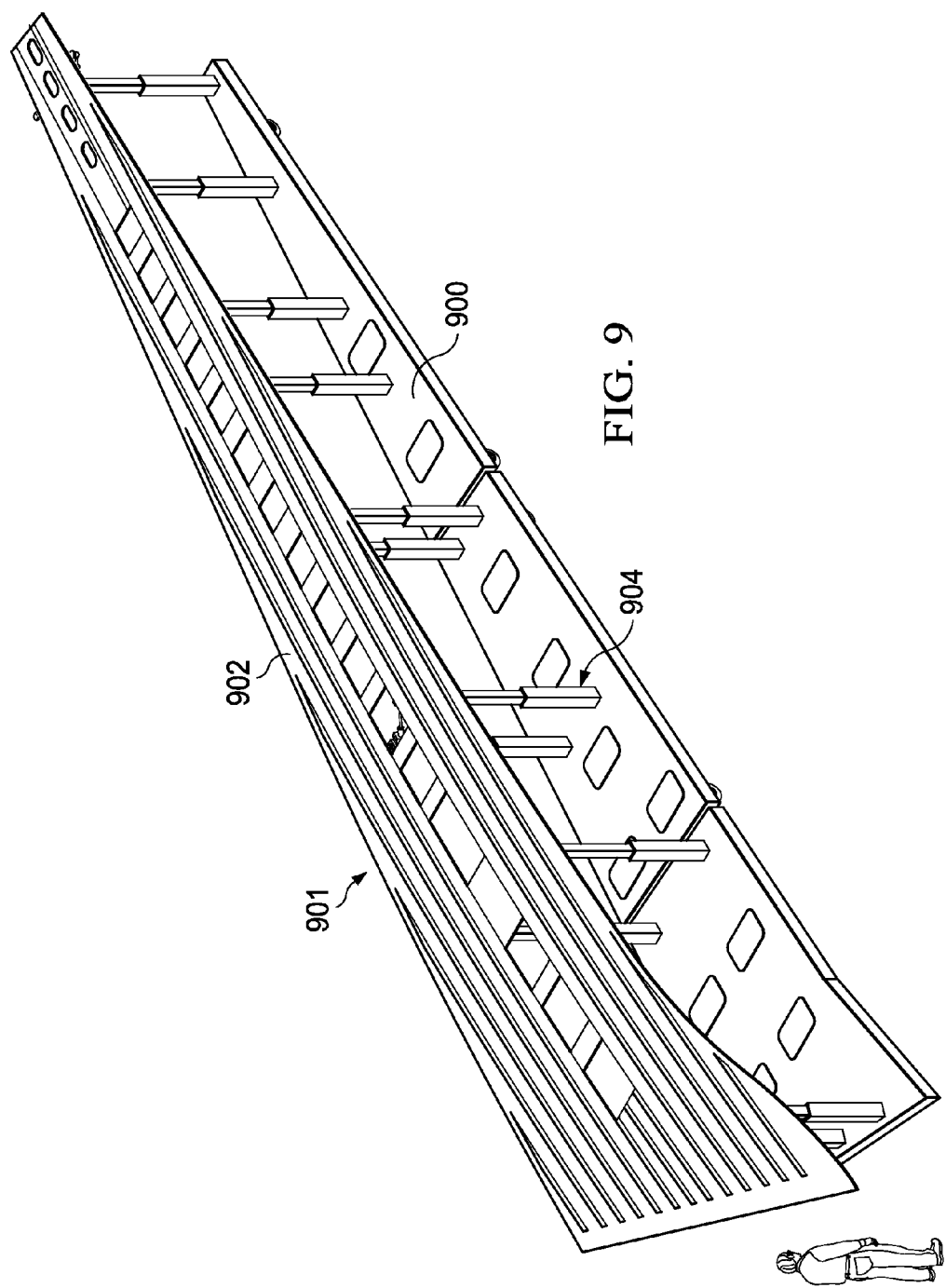
FIGS. 9-12 are illustrations of an assembly sequence for a wing in accordance with an advantageous embodiment.

In FIG. 9, carrier 900 supports lower panel assembly 902. Lower panel assembly 902 may be comprised of one or more skin panels placed onto support system 904 of carrier 900. Lower panel system 902 may be placed onto support system 904 while carrier 900 moves or is stationary.

Figure 10:
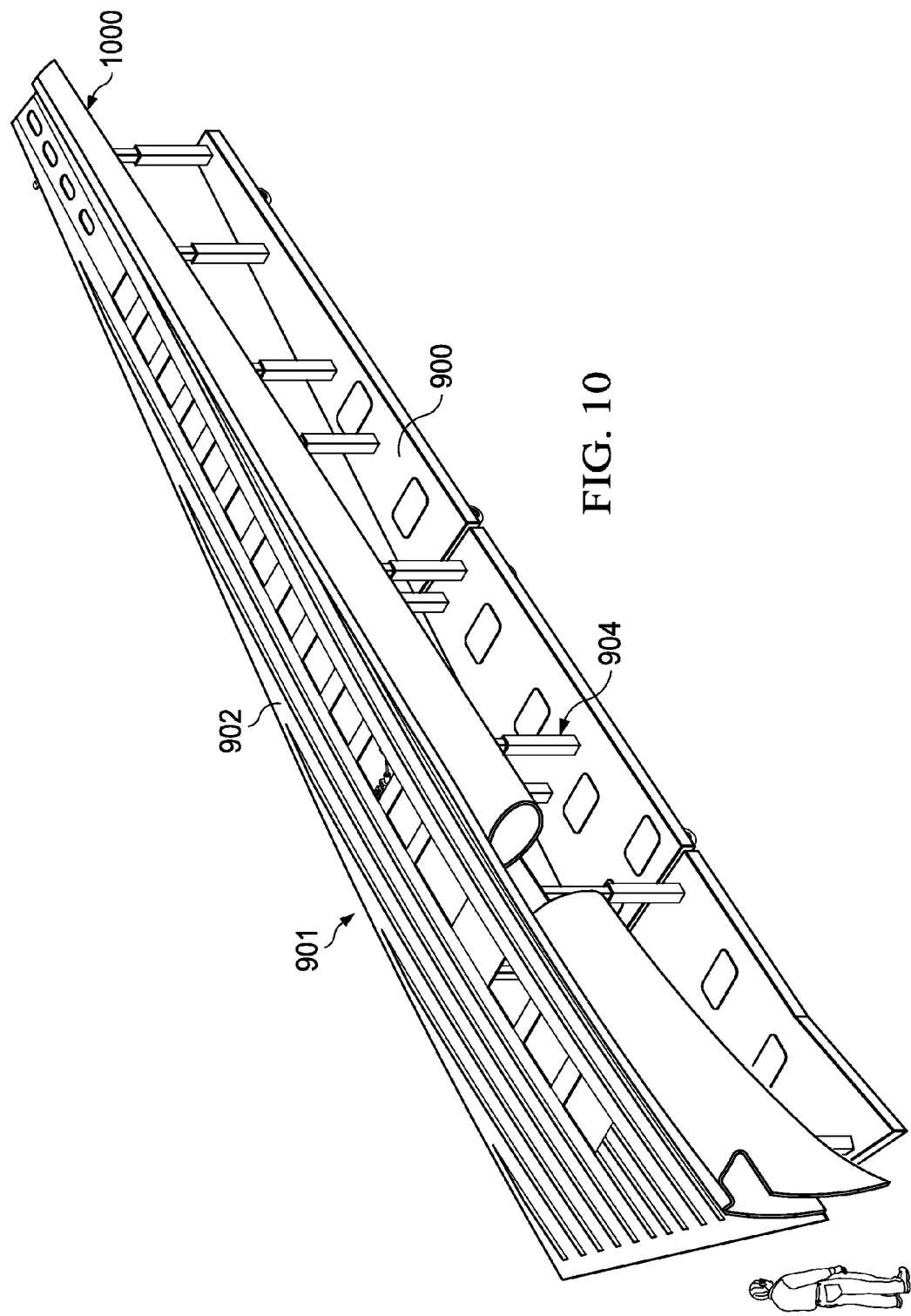

Turning now to FIG. 10, front spar system 1000 for wing 901 is assembled on lower panel system 902. Front spar system 1000 may comprise one or more spars, as well as components used to secure the spars to each other and/or lower panel system 902. The spars are structural components for wing 901.

Figure 11:
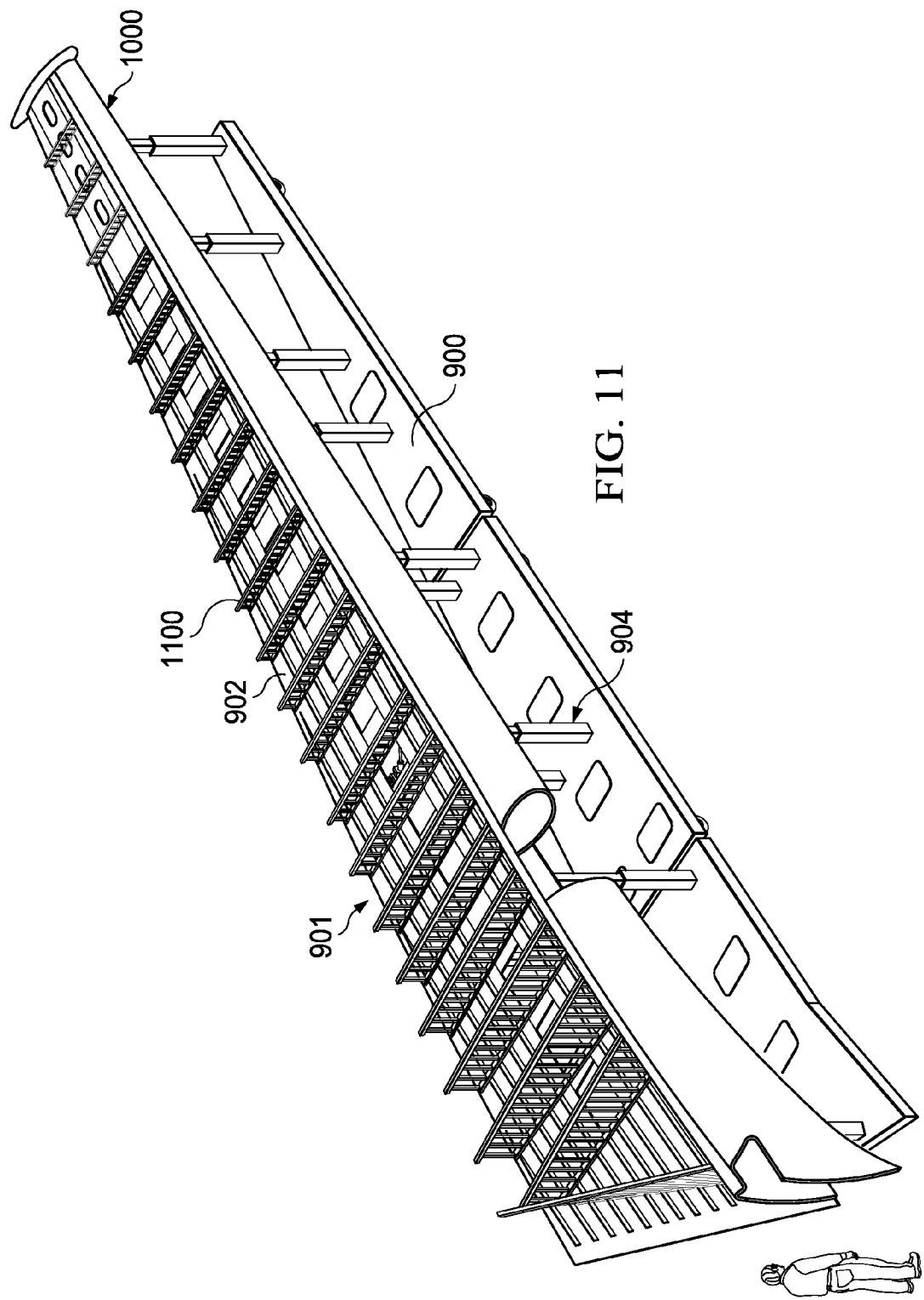

Turning now to FIG. 11, an illustration of ribs assembled onto a wing is depicted in accordance with an advantageous embodiment. In this illustration, rib system 1100 is secured to lower panel system 902 and front spar system 1000 for wing 901. Rib system 1100 includes one or more ribs, as well as components used to secure the ribs to each other and/or lower panel system 902.

Figure 12:
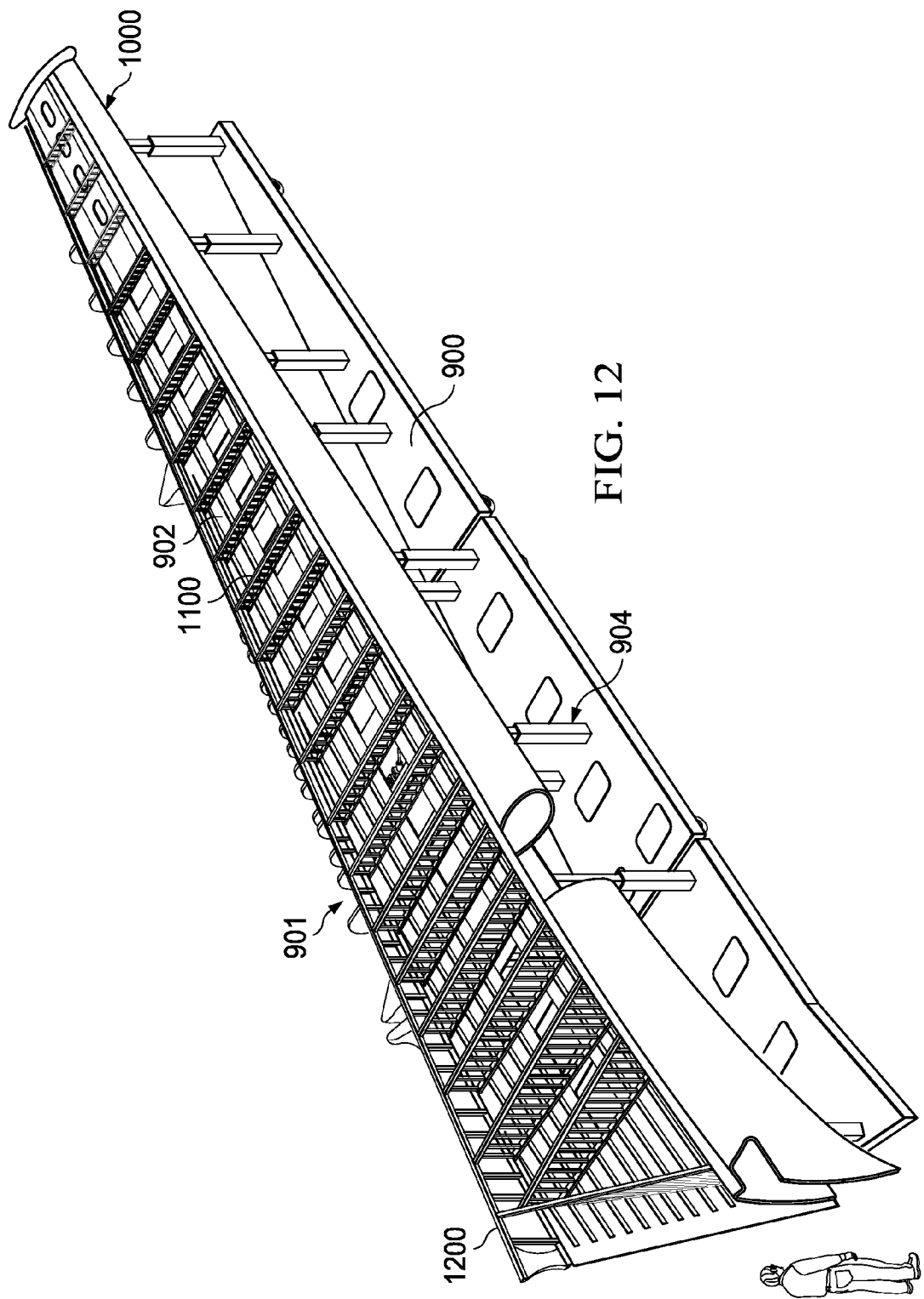

Next, in FIG. 12, an illustration of another stage in the assembly of a wing is depicted in accordance with an advantageous embodiment. In this example, rear spar system 1200 has been added to wing 901. Rear spar system 1200 includes one or more spars and components used to secure the spars to each other and/or lower panel system 902.

Figure 13:
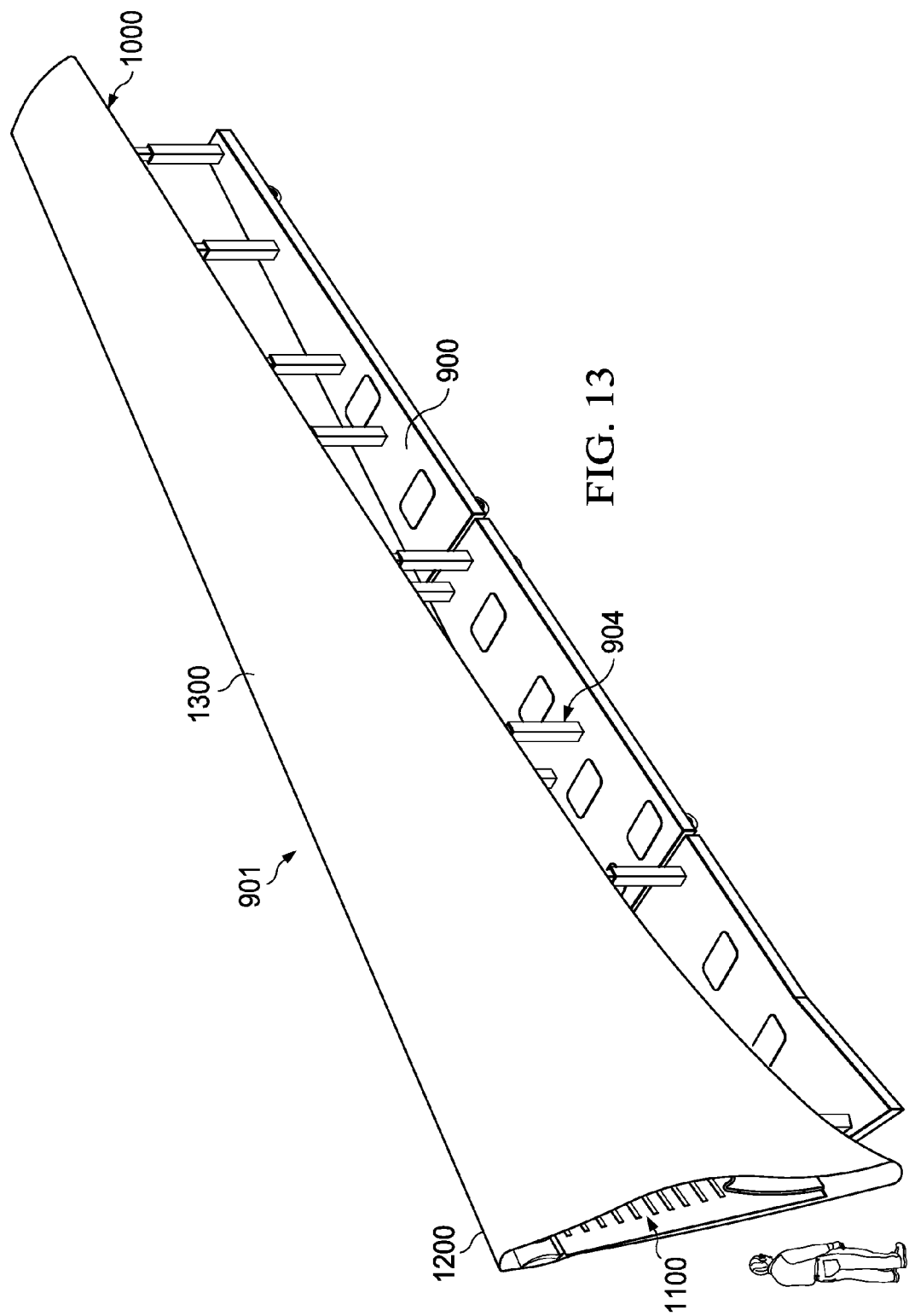
FIG. 13 is an illustration of an assembled wing on a carrier in accordance with an advantageous embodiment.

Turning to FIG. 13, an illustration of an assembled wing on a carrier is depicted in accordance with an advantageous embodiment. In this example, upper panel system 1300 is secured to front spar system 1000, rib system 1100, and rear spar system 1200.

Of course, FIGS. 9-13 only show some of the stages in the assembly of wing 901 using carrier 900. Other stages may be present in addition to the ones shown in these figures. For example, cleaning, sanding, painting, sealing, wiring, the attachment of fairings and/or control surfaces, and/or other operations may be performed which are not illustrated.

Figure 14:
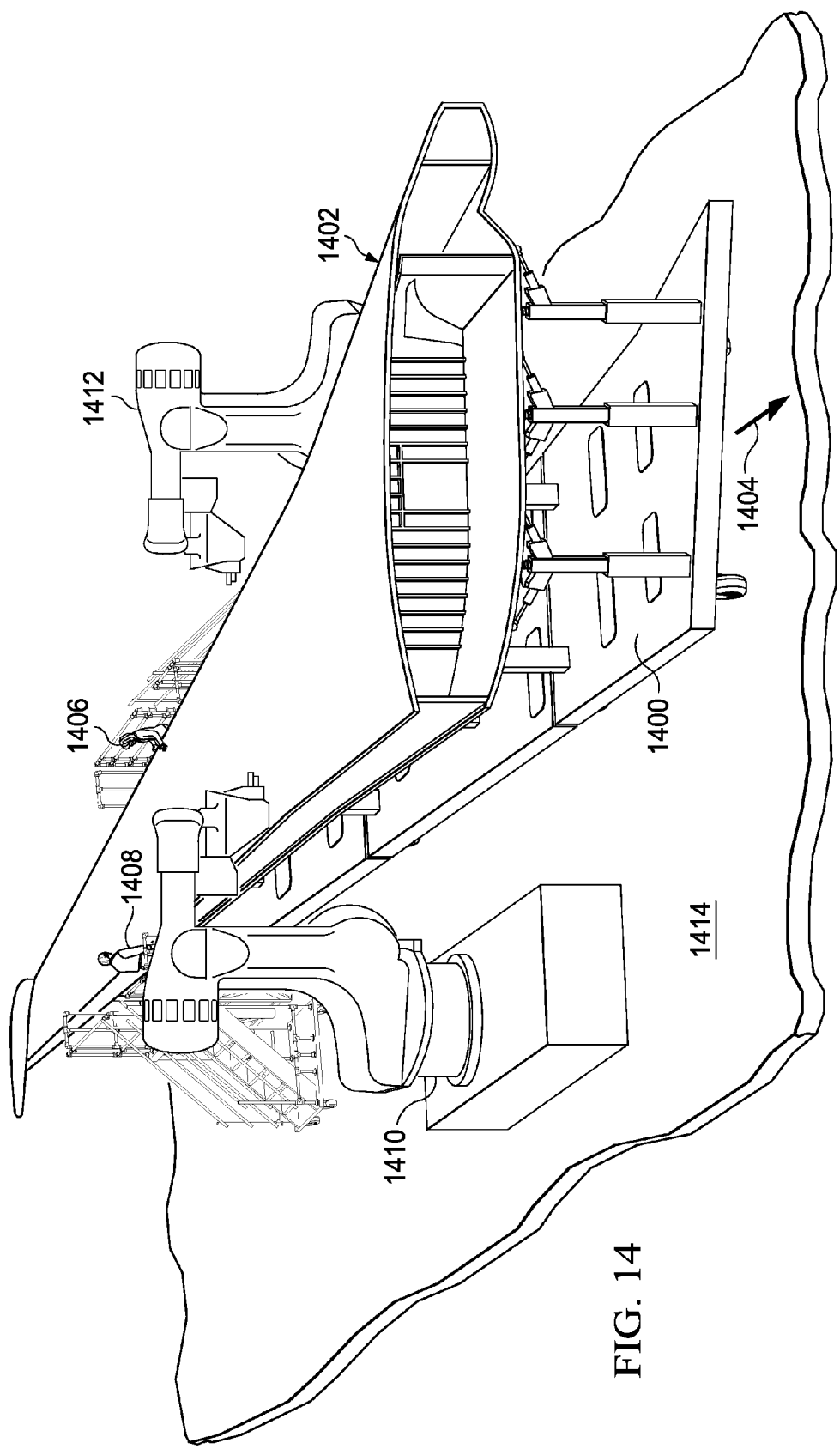
FIG. 14 is an illustration of a carrier supporting a structure in accordance with an advantageous embodiment.

With reference now to FIG. 14, an illustration of a carrier supporting a structure is depicted in accordance with an advantageous embodiment. Carrier 1400 is an example of an implementation of carrier 306 in FIG. 3.

In this illustrative example, carrier 1400 supports wing 1402 during the assembly of wing 1402. Carrier 1400 moves wing 1402 in the direction of arrow 1404, while different operations are performed on wing 1402. As depicted, operators 1406 and 1408 perform operations on wing 1402. Additionally, tools 1410 and 1412 also perform operations on wing 1402.

As can be seen in this illustrative example, tools 1410 and 1412 remains stationary, while wing 1402 moves in the direction of arrow 1404 on carrier 1400. In these depicted examples, carrier 1400 is configured to maintain wing 1402 in a substantially desired orientation, while carrier 1400 moves on surface 1414.

Figure 15:
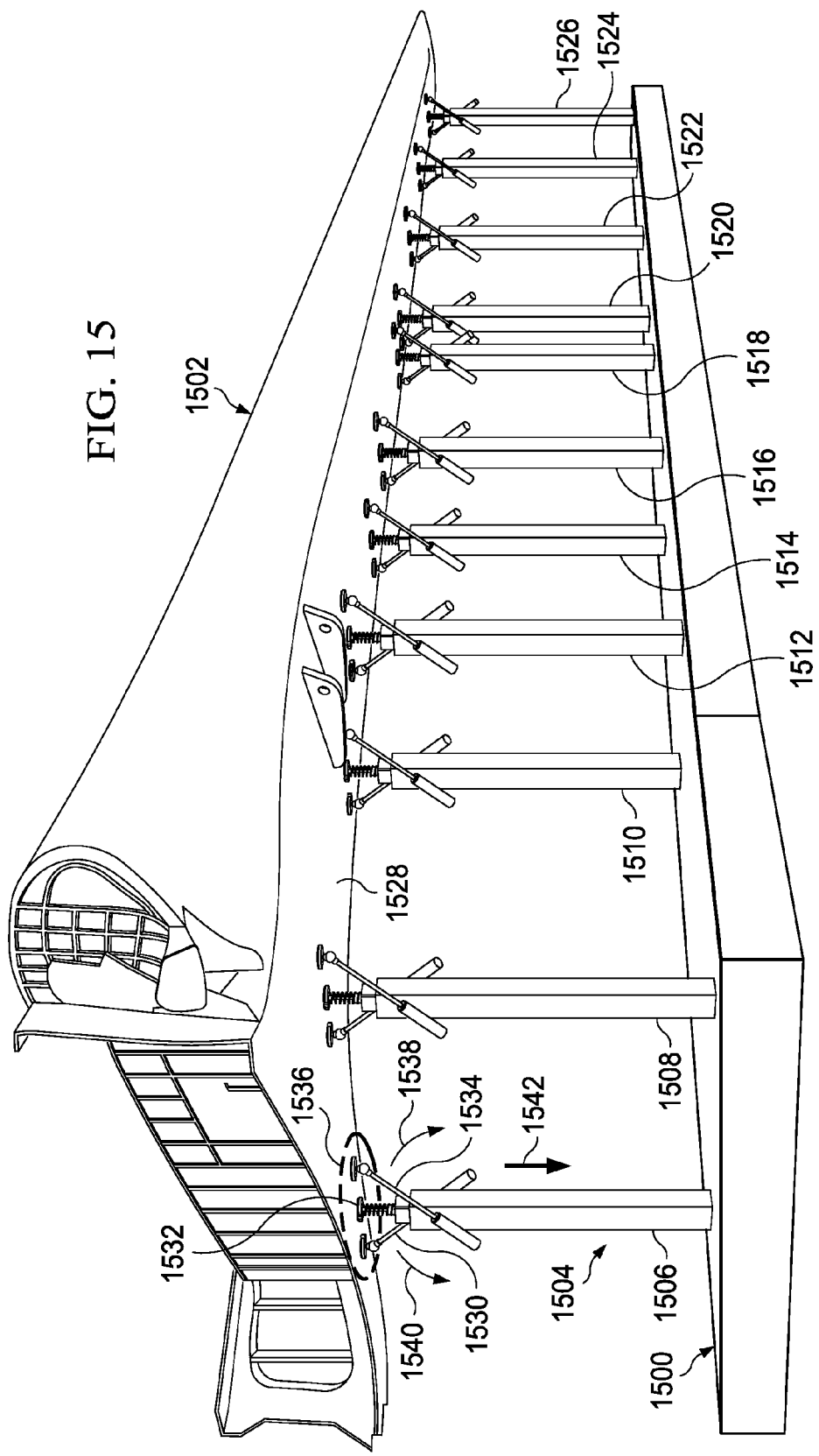
FIG. 15 is an illustration of another view of a carrier supporting a wing in accordance with an advantageous embodiment.

Turning now to FIG. 15, an illustration of a carrier supporting a wing is depicted in accordance with an advantageous embodiment. Carrier 1500 is an example of an implementation for carrier 306 in FIG. 3.

In this example, carrier 1500 supports wing 1502 during the assembly of wing 1502. Support system 1504 holds wing 1502 in these examples. As illustrated, support system 1504 includes support members 1506, 1508, 1510, 1512, 1514, 1516, 1518, 1520, 1522, 1524, and 1526.

Further, in this illustrative example, these support members are capable of being reconfigured to provide access to different portions of side 1528 of wing 1502. For example, support member 1506 includes base 1528 and moveable members 1530, 1532, and 1534. These moveable members may be reconfigured to provide access to section 1536, which may be covered by moveable members 1530, 1532, and 1534.

For example, moveable member 1534 may move in the direction of arrow 1538. Moveable member 1530 may move in the direction of arrow 1540, and moveable member 1532 may move in the direction of arrow 1542.

Figure 16:
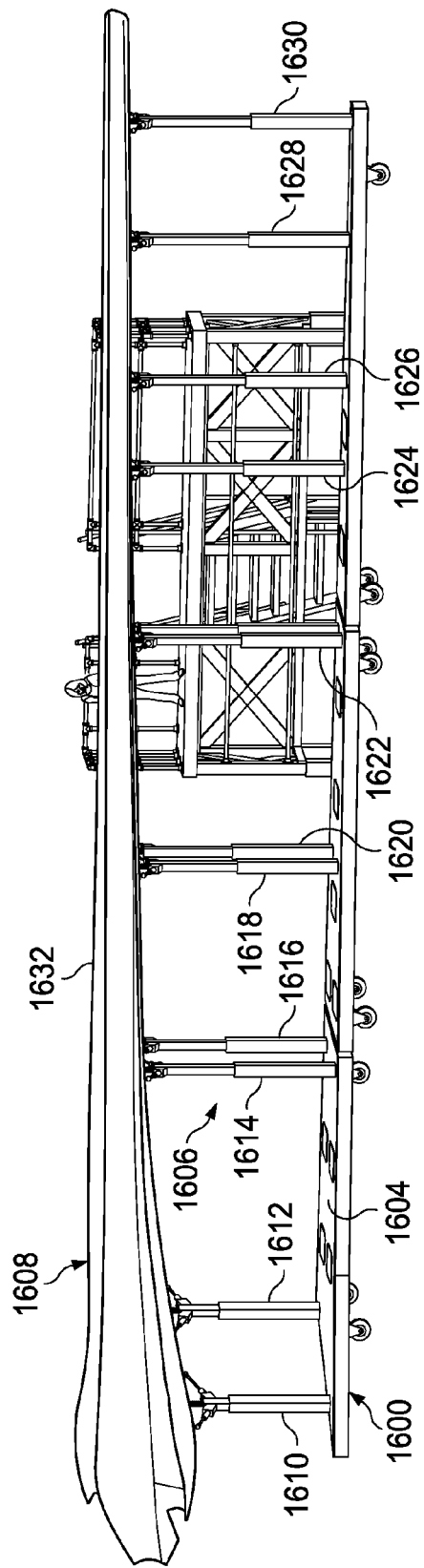
FIG. 16 is an illustration of a carrier supporting a wing in accordance with an advantageous embodiment.

Turning now to FIG. 16, an illustration of a carrier supporting a wing is depicted in accordance with an advantageous embodiment. In this illustrative example, carrier 1600 is an example of one implementation for carrier 306 in FIG. 3. In this view, carrier 1600 includes platform 1604 and support system 1606. Support system 1606 supports wing 1608.

As can be seen in this example, support members 1610, 1612, 1614, 1616, 1618, 1620, 1622, 1624, 1626, 1628, and 1630 may vary in the extension of the support members to maintain wing 1608 in a desired orientation. In this example, the orientation is a substantially horizontal orientation with respect to top surface 1632 of wing 1608.

Figure 17:
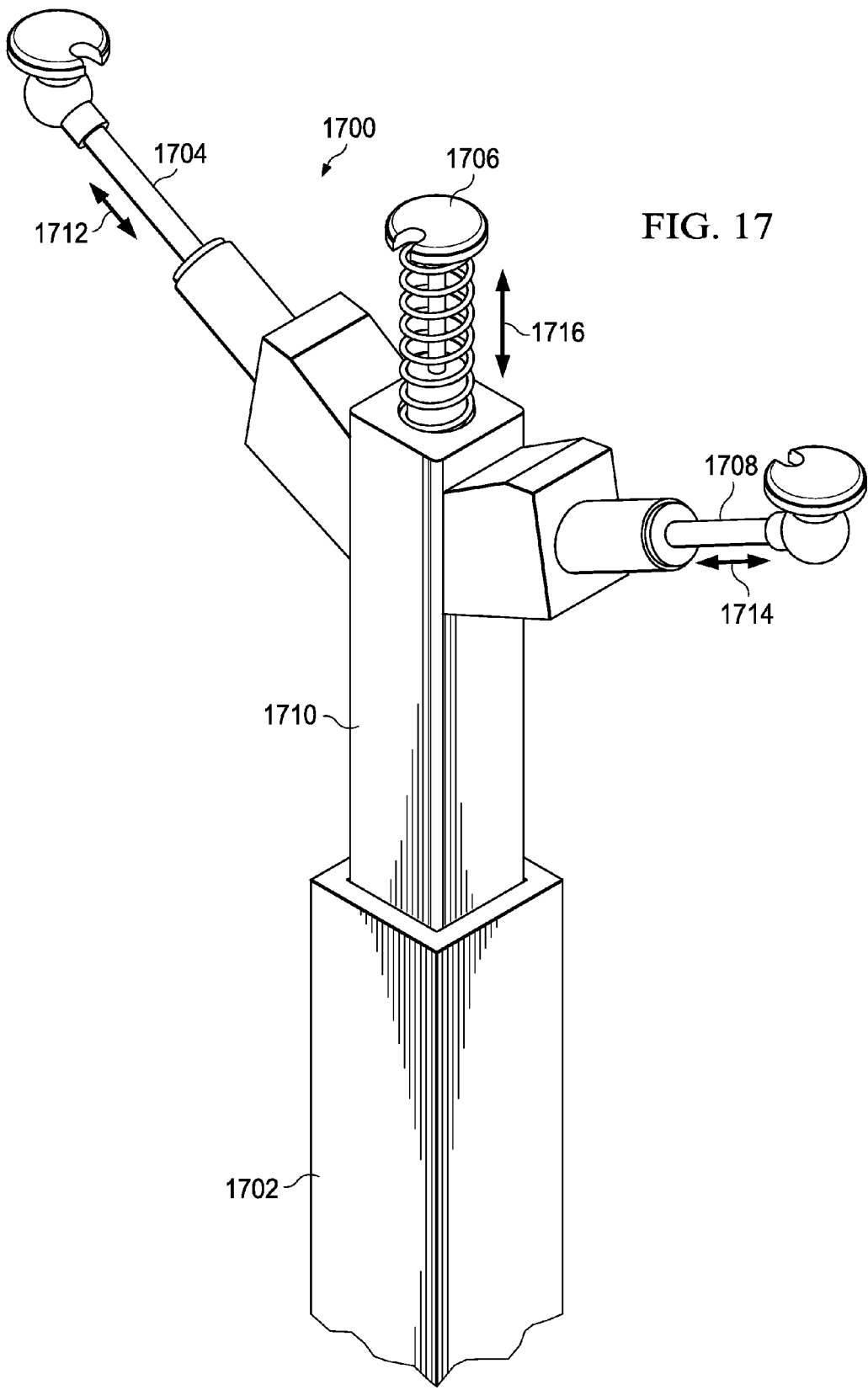
FIG. 17 is an illustration of a support member in accordance with an advantageous embodiment.

With reference now to FIG. 17, an illustration of a support member is depicted in accordance with an advantageous embodiment. In this example, support member 1700 is an example of one implementation for support member 340 in FIG. 3.

Support member 1700 has base 1702 and moveable members 1704, 1706, 1708, and 1710. These moveable members may extend in different distances independently of each other with respect to base 1702.

Moveable member 1704 may be moved in the direction of arrow 1712. Moveable member 1708 may be moved in the direction of arrow 1714. Moveable member 1706 may be moved in the direction of arrow 1716. These moveable members may be controlled by an actuator, such as an electromechanical actuator or a pneumatic mechanism.

In this manner, access to different portions of a structure may be increased. Additionally, moveable member 1710 is moveable with respect to base 1702 in the direction of arrow 1716. These different configurations may be controlled by a human operator and/or by a controller, depending on the particular implementation.

Figure 18:
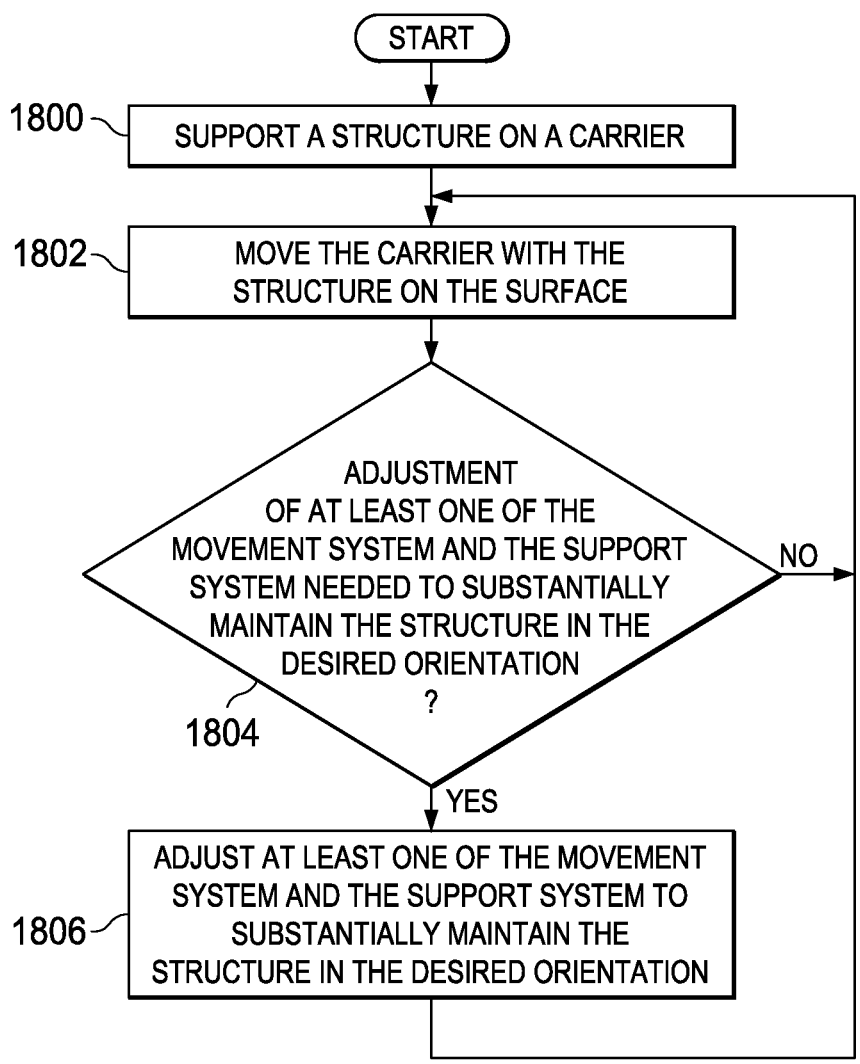
FIG. 18 is an illustration of a flowchart of a method for moving a structure in accordance with an advantageous embodiment.

With reference now to FIG. 18, an illustration of a flowchart of a method for moving a structure is depicted in accordance with an advantageous embodiment. In this illustrative example, the flowchart in FIG. 18 may be implemented in manufacturing environment 300 in FIG. 3.

The process begins by supporting a structure on a carrier (operation 1800). The carrier has a platform with a first side and a second side. The carrier also has a movement system associated with the first side and configured to move the platform on a surface. A support system for the carrier is associated with a second side of the platform and configured to support the structure on the platform. The carrier also includes a leveling system configured to substantially maintain the structure in the desired orientation during movement of the platform on the surface.

The process then moves the carrier with the structure on the surface (operation 1802). A determination is made as to whether an adjustment of at least one of the movement system and the support system is needed to substantially maintain the structure in the desired orientation (operation 1804). If an adjustment is not needed, the process returns to operation 1802. Otherwise, the process adjusts at least one of the movement system and the support system to substantially maintain the structure in the desired orientation (operation 1806), with the process then returning to operation 1802.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in the flowchart or block diagram.

Thus, one or more of the different advantageous embodiments provides a carrier that is configured to support a structure. The structure may be supported in a substantially desired orientation during movement of the carrier. With a carrier such as, for example, carrier 306 in FIG. 3, a structure may be supported on the carrier and moved over surfaces that may be uneven. When uneven surfaces are encountered by carrier 306, a leveling system performs adjustments to carrier 306 to maintain the structure in a substantially desired orientation.

With the different advantageous embodiments, a structure, such as a wing, may be manufactured, while the structure moves along an assembly line or area. As a result, tools may remain stationary. Also, the time needed to move a structure from one station to another station to perform different operations may be reduced and/or avoided. In the different advantageous embodiments, the carrier may be moved continuously or in pulses. By moving the carrier in pulses, portions of the structure may be placed into range or reach of a particular tool to perform operations. Then the structure may be moved again to allow the tool to perform operations in other portions of the structure.

The description of the different advantageous embodiments has been presented for purposes of illustration and description, and it is not intended to be exhaustive or limited to the embodiments in the form disclosed. Many modifications and variations will be apparent to those of ordinary skill in the art.

Although the different advantageous embodiments have been described with respect to aircraft, the different advantageous embodiments also recognize that some advantageous embodiments may be applied to other types of platforms. For example, without limitation, other advantageous embodiments may be applied to structures for a mobile platform, a stationary platform, a land-based structure, an aquatic-based structure, a space-based structure, and/or some other suitable object. More specifically, the different advantageous embodiments recognize that different embodiments may be applied to, for example, without limitation, a structure for a submarine, a bus, a personnel carrier, a tank, a train, an automobile, a spacecraft, a space station, a satellite, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a platform having a first side and a second side;
a movement system associated with the first side and configured to move the platform on a surface, the movement system comprising a plurality of wheels and a motor to turn at least a portion of the plurality of wheels;
a support system associated with the second side of the platform and configured to support a structure on the platform, the support system comprising a plurality of support members, each of the plurality of support members comprising a base and a number of moveable members; and
a leveling system configured to substantially maintain the structure in a desired orientation during movement of the platform on the surface, the leveling system comprising a laser alignment system and an actuator system, the actuator system associated with the plurality of wheels.

2. The apparatus of claim 1 further comprising:
a power system.

3. The apparatus of claim 1 further comprising:
a utility system.

4. The apparatus of claim 1 further comprising:
a lighting system associated with the platform.

5. The apparatus of claim 1 further comprising:
a number of lifts on the second side of the platform.

6. The apparatus of claim 1, wherein the leveling system is configured to adjust at least one of the movement system and the support system to substantially maintain the structure in the desired orientation during the movement of the platform on the surface.

7. The apparatus of claim 1, wherein the
actuator system is configured to adjust a distance between each wheel in the plurality of wheels and the first side of the platform; and
wherein the leveling system further comprises a controller coupled to the laser alignment system and the actuator system, wherein the controller is configured to control the actuator system to substantially maintain the structure in the desired orientation.

8. The apparatus of claim 1, wherein the platform comprises:
a plurality of segments configured to be decoupled from each other.

9. The apparatus of claim 1, wherein the plurality of support members are configured to hold the structure.

10. The apparatus of claim 9, wherein the base is associated with the second side of the platform and the number of moveable members is configured to hold the structure.

11. The apparatus of claim 2, wherein the power system comprises a wireless power system.

12. The apparatus of claim 11, wherein the wireless power system comprises a system selected from one of an inductive power system and a laser power system.

13. The apparatus of claim 1, wherein the structure is selected from one of a wing, a horizontal stabilizer, a vertical stabilizer, an engine, and a fuselage.

14. A carrier for aircraft structures comprising:
a platform having a first side and a second side;
a movement system having a plurality of wheels associated with the first side and configured to move the platform on a surface;
a plurality of support members associated with the second side and configured to hold the aircraft structure on the platform;
a laser alignment system;
an actuator system associated with the plurality of wheels and configured to adjust a distance between each wheel in the plurality of wheels and the first side of the platform; and
a controller coupled to the laser alignment system and the actuator system, wherein the controller is configured to control the actuator system to substantially maintain the structure in a desired orientation.

15. The carrier of claim 14 further comprising:
a wireless power system.

16. The carrier of claim 14, wherein the aircraft structure is selected from one of a wing, a horizontal stabilizer, a vertical stabilizer, an engine, and a fuselage.

17. A method for moving a structure, the method comprising:
supporting the structure on a carrier comprising a platform having a first side and a second side; a movement system associated with the first side and configured to move the platform on a surface; a support system associated with the second side of the platform and configured to support the structure on the platform; and a leveling system configured to substantially maintain the structure in a desired orientation during movement of the platform on the surface;
moving the carrier with the structure over the surface; and
adjusting at least one of the movement system and the support system to substantially maintain the structure in the desired orientation while moving the carrier.

18. The method of claim 17, wherein the movement system comprises a plurality of wheels and a motor configured to turn at least a portion of the plurality of wheels, and wherein the step of adjusting at least one of the movement system and the support system to substantially maintain the structure in the desired orientation comprises:
changing a distance between a number of the plurality of wheels and the first side to substantially maintain the structure in the desired orientation.

19. The method of claim 17, wherein the support system comprises a plurality of support members, wherein the plurality of support members has a base and a number of moveable members, and wherein the step of adjusting at least one of the movement system and the support system to substantially maintain the structure in the desired orientation comprises:
changing a configuration of the number of moveable members for a number of support members in the plurality of support members.

20. The method of claim 17, wherein the platform comprises a plurality of segments configured to be decoupled from each other.

* * * * *